United States Patent

[11] 3,573,361

[72] Inventor Fujiaki Narita
Amagasaki, Japan
[21] Appl. No. 857,323
[22] Filed Sept. 12, 1969
[45] Patented Apr. 6, 1971
[73] Assignee Sanyo Electric Co., Ltd.
Moriguchi-shi, Japan
[32] Priority Sept. 14, 1968
[33] Japan
[31] 43/66281

[54] SERVO CONTROL SYSTEM FOR VIDEO-TAPE RECORDER WITH SLOW-MOTION REPRODUCING CAPABILITY

13 Claims, 5 Drawing Figs.

[52] U.S. Cl. .......... 178/6.6, 179/100.2
[51] Int. Cl. .......... G11b 5/00, H04n 5/08, H04n 5/78
[50] Field of Search .......... 179/100.2 (T), 100.2 (S); 178/6.6 (A), 6.6 (PISC), 6.6 (FSS)

[56] References Cited
UNITED STATES PATENTS
3,395,248 7/1968 Suzuki et al. .......... 178/6.6

*Primary Examiner*—Terrell W. Fears
*Assistant Examiner*—Steven B. Pokotilow
*Attorney*—Darby and Darby

ABSTRACT: A servosystem for controlling the rotary phase of the heads of a video-tape recorder with slow-motion reproducing capability in which tape transporting means convey a tape along the periphery of a cylindrical guide member within which rotates a rotary member having rotary heads thereon at the slowed-down speed of $1/n$ that of the recording speed during slow-motion reproduction. The system includes first pulse generating means for generating a series of standard control pulses in relation to the recorded signals, second pulse generating means to generate a series of slow-motion control pulses which have $n$ times the frequency of said standard pulses, recording means for recording both said control pulses on the tape along its longitudinal direction, and rotary head servocontrol system. The servocontrol system operates the head carrying member during normal speed reproduction to maintain the same phase as in recording in response to error signals produced by comparing phase detecting signals from the rotating member carrying the heads with the reproduced standard control signals. During slow speed reproduction error signals to operate the servo-system are produced by comparing phase detecting signals from the rotating member with recorded slow-motion control signals which have the same frequency as the standard control signals when the tape is transported in slow motor reproduction at the slowed-down speed of $1/n$ that normal reproduction.

INVENTOR.
FUJIAKI NARITA

INVENTOR.
FUJIAKI NARITA

SERVO CONTROL SYSTEM FOR VIDEO-TAPE RECORDER WITH SLOW-MOTION REPRODUCING CAPABILITY

Ser. No. 857,504 filed on Sept. 12, 1969 filed concurrently herewith in the name of Fujiaki Narita and entitled "Video Tape Recorder with Slow Motion Reproducing Apparatus" and Ser. No. 857,358, filed on Sept. 12, 1969, filed concurrently herewith in the name of Soji Nakamoto and entitled "A Video Tape Recorder with a Still Reproduction Device," both of which are assigned to the same assignee.

The present invention relates to a video-tape recorder for recording and reproducing wideband video signals which have the capability of reproducing slow-motion pictures, and more particularly to a servo control system for use in a magnetic video-tape recorder of the helical scanning type.

One of the advantages of a video-tape recorder of the helical scanning type over that of the transverse scanning type is to provide easier reproduction of slow-motion pictures. As is known, the helical-type recorders comprise a full or partial helical wrap of the tape around a drum within which one or more magnetic heads rotate, the heads making contact with the tape through a slit in the drum. In such helical scanning video-tape recorders, a slow-motion picture is reproduced by retracing $n$ times the same track of a tape which is transported at a slowed-down speed of $1/n$ that of the normal reproduction. When this slow speed is used, it is necessary to compensate the tracking error between the recorded track on the tape and the locus of the rotating heads. Also a highly accurate servosystem should be used for the rotating heads to maintain as precisely as possible the rotary phase of the reproducing heads in the slow-motion reproduction with respect to the original signals recorded.

In prior art recorders, the rotary phase of the reproducing heads is controlled by a servosystem which operates in response to standard control signals which are reproduced by a fixed control head. The standard control signals are recorded on the edge of the tape along its longitudinal direction. Since during slow motion reproduction, the tape is being conveyed at the slowdown speed of $1/n$ that of normal speed reproduction, the standard control signals reproduced have a frequency of $1/n$ that of recording so that they are not suitable as control signals during slow-motion reproduction. To obtain control signals in slow-motion reproduction, the subject invention provides slow-motion control signals of a frequency $n$ times that of the standard control signals which are recorded on the tape in addition to the standard control signals. The separate slow-motion control signals and the standard control signals can be recorded on separate tracks individually or on the same track as separable mixed signals. The slow-motion control signals are reproduced like the standard control signals in the slow-motion reproduction according to the slowed-down speed of the tape.

An object of this invention is to provide a simplified video-tape recorder of the helical scanning type with a slow-motion servosystem having improved structural features and operational characteristics suitable for the reproduction of a jitterless and stable slow-motion picture.

Another object is to provide a compact video-tape recorder of the helical scanning type having a servosystem suitable for controlling the rotating head or heads during both normal and slow-motion reproduction, and more specifically a video-tape recorder in which standard control signals and slow-motion control signals are recorded and reproduced with the slow-motion control signals having a frequency of $n$ times that of the standard control signals.

A further object is to provide a video-tape recorder of the character indicated that is simple in design, that is reasonable in manufacturing cost; and that is capable of performing its intended functions in an entirely satisfactory and trouble-free manner.

To the end that the foregoing objects may be achieved, a preferred and recommended video-tape recorder according to this invention comprises tape transporting mechanism which during slow-motion reproduction of a signal recorded at normal speed conveys a tape at a speed of $1/n$ of normal speed, where $n$ is an integer. The tape is moved over the periphery of a pair of guide cylinders which are coaxially mounted within which rotates a member with one or more magnetic heads on its periphery. This arrangement is shown in the two aforesaid copending applications. The recorder also has a generator for standard control signals in the form of control pulses for reproduction at normal speeds which pulses are referenced to the rotary phase of the rotary member during normal speed recording. A second signal generator provide control pulses for slow-motion reproduction which have a frequency of $n$ times that of the standard control pulses used for normal speed reproduction. Both the standard and the slow-motion control pulses are recorded by one or two heads on a track, or tracks, disposed on the magnetic tape in the longitudinal direction. A basic portion of the servosystem for controlling the rotary phase of rotary head responds to synchronizing signals, such as the vertical sync signals, which are a part of the video information signals, as its standard in recording. During reproduction at normal speeds the servosystem for controlling the rotary phase of rotary head operates in response to the reproduced standard control signals and also cooperates with the basic portion of the servocontrol system used during recording. During reproduction at slow-motion speeds another servo means for controlling the rotary phase of rotary head operates in response to the recorded slow-motion control signals also in cooperation with the basic servocontrol position.

The foregoing objects and other objects, together with the advantages of this invention, will be described for a full helical scanning type video-tape recorder with two rotary heads. The principles apply to other types of recorders, for example, a half helical-type video-tape recorder with one or two main rotary heads, a full helical recorder with only one rotary head and also a 360°/$n$ deduced ($n$: integer) helical-type video-tape recorder with $n$ main rotary heads. Other types of partial helical recorders also can utilize the present invention.

The present invention will be better understood from the following description of an embodiment of the invention shown, by way of example only, in connection with the accompanying drawings in which.

Figure 1:
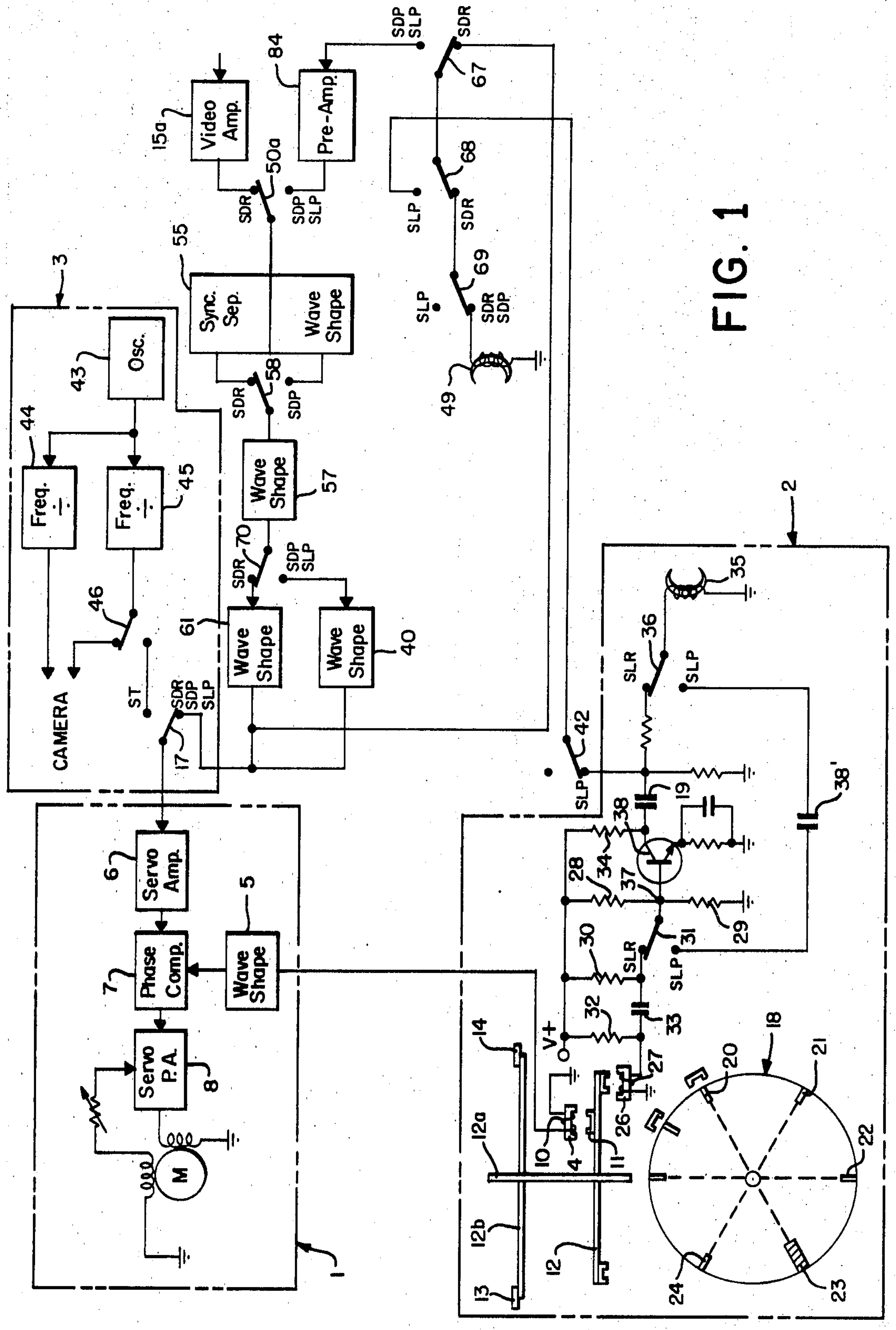
FIG. 1 is a schematic block diagram of the servosystem of the video-tape recorder embodying the present invention.

The schematic block diagram of the servocontrol system for the heads of a magnetic video-tape recorder of this invention as disclosed in FIG. 1 includes a basic servocontrol circuit 1 and its concomitant circuits of slow-motion servocontrol 2 and of still servocontrol 3. The various operating modes of the system are explained below with the switch positions having the corresponding legends.

A. Normal Speed Record (SDR)

The basic servocontrol circuit 1 is designed to maintain the angular phase of the rotary head to the same phase as that of standard signals. In recording, for instance, vertical synchronizing signals separated from video signals are used as the standard signals and compared by phase detection with signals from the rotating heads to produce an output error signal which drives a servomechanism to make the rotary phase of the heads correspond to that of standard (sync) signals.

The fundamental circuit components of the basic servocontrol circuit 1, as shown in FIG. 1, include a rotary phase detecting device 4, a wave shaping circuit 5, a servoamplifier circuit 6, a phase comparator 7, a servo power amplifier 8 and an eddy current brake control mechanism 9 shown adjacent the head drive motor.

The rotary phase detecting device 4 comprises a detecting coil into which a signal is induced by a magnetic member 11 mounted on the periphery of a rotary disc member 12. Disc 12 is mounted on a rotatable shaft **12*a* on which is also mounted a disc 12*b*. The magnetic recording/reproducing heads 13 and 14 are mounted on disc 12*b*. A series of detecting pulses of a frequency equal to the speed of revolution of disc 12 are induced across detecting coil 10 and applied to wave shaping circuit 5 which, for example, is a Schmitt trigger circuit or a class C-type amplifier. The shaping circuit 5 squares off the induced signals and applies them to the phase comparator 7**.

The video signal to be recorded passes through a video amplifier **15*a* and a sync separator circuit 15 where the vertical sync pulses are stripped from the video signal. Other standard control signals can be used. The vertical sync pulses are preferably further filtered to eliminate all horizontal sync pulse components and applied to a pulse amplifier 57 and wave shape circuit 61 which serve to increase the duration of the vertical sync pulses. The widened pulses are applied through a switch 17 set to SDR, to the servoamplifier 6. The other output of separator 15 are the video signals which are applied by circuits (not shown) to the recording heads 13, 14. The output pulses of the servoamplifier 6 and the output pulses of the wave shaping circuit 5 are applied separately to two input terminals of the phase comparator 7, the former as standard pulses and the latter as detecting pulses. The construction and the operation of the phase comparator 7 is conventional and can, for example, resemble in part that of an automatic phase control circuit in color television sets. The details of a preferred circuit 7 are described hereinafter. The phase difference between the standard pulses and the detected pulses from coil 10 appears as a direct current error signals at the output of comparator 7 which are amplified by the servo power amplifier 8 to energize the eddy current brake control mechanism 9. The servo brake 9 operates to make the detected pulses from coil 10** coincide with the vertical sync signals.

During normal speed record (SDR), standard control signals are being recorded by a fixed head 49 along the longitudinal length of the tape. The standard control signals are produced by taking the widened vertical sync signals from pulse amplifier 57 and wave shape circuit 61 and applying them through switches 67, 68, 69 to the head 49 and recorded on the tape. These standard control signals are referred to in FIG. 2 as track TC.

As will be described, the basic servocontrol circuit 1 operates in each of the recording and three types of reproducing operations, namely the normal speed, slow-motion speed and still reproduction.

B. Slow-Motion Control Signals-Record (SLR)

During this mode of operation the recorder operates only to produce the slow-motion control signals and to record them on the tape. Actually, the recording of the slow-motion control signals takes place when the video-tape recorder is operating to record at normal speed.

Figure 2:
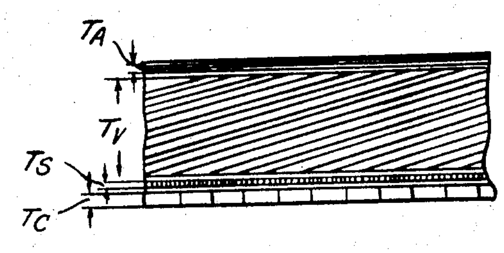
FIG. 2 shows the disposition of recorded tracks on the magnetic tape adapted to the video-tape recorder of this invention.

Referring to FIG. 1 a slow-motion control signal generator 18 includes a plurality of *n* magnetizing pieces 20, 21, 22, 23, 24, 25 mounted on the peripheral edge on the reverse side of the rotary disc 12 at an angle of 360°/*n* with respect to each other, where *n* is an integer which is the reciprocal of the number that is the slowdown ratio (*n*=6 in this example). A pulse detector in the form of a C-shaped magnetic core 26 and a pickup coil 27 wound around it is located adjacent to the reverse side of disc 12 and is disposed in the circular path travelled by the magnetic pieces 20, 21, 22, 23, 24, 25. An amplifying transistor 38 of the pulse amplifier circuit 19 is biased by voltage divider resistors 28, 29 and a resistor 30, the latter resistor connected by a switch 31 to the base of transistor 38. Transistor 38 operates as a class A amplifier to amplify the series of detected pulses produced by coil 27 which appear across a load resistor 32 and are applied to the base input of amplifier transistor 29 through a coupling capacitor 33. The series of output pulses produced across the load resistor 34 of transistor 38 is applied to the input coil of a slow-motion magnetic control head 35 and recorded on a separate track, named the slow-motion control track, of the tape. The disposition of the slow-motion control track and other tracks is illustrated in FIG. 2. It should be understood that the slow-motion control signals are at a frequency of *n* times the vertical sync signals, since there are six magnetic pieces 20—25 and the disc 12 is rotating at normal speed. The production of the standard control signals is discussed below.

In FIG. 2 a track TA of horizontal hatchings represents an audio track; the tracks TV of slant hatchings represent the video tracks, the track TS of crosshatchings is the slow-motion control signal track; and the track TC of crosshatchings is the standard control signal track.

C. Slow-Motion Reproduce (SLP)

During slow-motion reproduction the switch 31 is switched from SLR position to SLP position together with switch 36. At the same time, the speed of the tape is reduced by a factor of 1/*n*. The slow-motion control signals are picked up by the slow-motion control head 35 and are applied through a coupling capacitor to the base of transistor 38 which is now biased, due to the removal of resistor 30, to operate as a Class C amplifier. The reproduced signals will be at a rate 1/*n* of that originally recorded. At the same time the pickup coil 27 will be producing signals at the same rate from pieces 20—25.

The reproduced slow-motion control signals from head 35 are the differential of the waveform recorded and a series of pulses of one polarity are produced by transistor 38 and amplified to a certain extent. The amplified series of pulses of one polarity are applied through switches 42, 68 and 67 in SLP position to a preamplifier 84 and the wave shaping and amplifying circuits 55, 57 and then through a switch 70 to the wave shaping circuit 40 which converts the input pulses from head 35 to a rectangular form. These pulses are then applied through switch 17 to the servoamplifier 6.

D. Still Motion Reproduction (ST)

It is desired that the recorder have the capability of reproducing as a still picture, a picture which was originally recorded at normal speed. To do this, the same track of the tape is repeatedly scanned with the tape stationary.

The still motion servocontrol 3 comprises a signal generator 43, a half frequency divider 44 and a 1/525 divider circuit 45. The signal generator 43 is preferably a crystal oscillator which has an oscillating frequency of 31.5 kHz. The output signals of a half divider circuit 44 (15.750 kHz. are at the horizontal scanning frequency of a pickup camera. The output signals of the 1/525 divider 45 (60 Hz.) are at the vertical scanning frequency of the pickup camera. Output signals which have a frequency of 60 Hz. from 1/525 divider circuit 45 are further divided into 30 Hz. pulses by a suitable divider (not shown) and applied to the input terminal of the servoamplifier 6 through switches 46, 17 as standard control pulses in still reproduction. This further divider is preferably connected between these two switches.

E. Normal Speed Reproduction (SDP)

In FIG. 1 the standard control signals recorded on the tape are reproduced by head 49 and applied through switches 69, 68 and 67 to the preamplifying circuit 84 and through switches **50*a* and 70 to the wave shaping circuits 55, 57 and 40. The squared signal goes through switch 17 (SDP) to the servoamplifier 6 and then to the phase comparator 7. Thus, during normal speed reproduction the standard control signals are phase compared with the detected signals from the pickup coil 10. The error signal produced by the comparator 7 operates the brake 9** to adjust the phase of the heads during normal speed reproduction to correspond with that during reproduction.

F. Detailed Circuit Diagram

Figure 3:
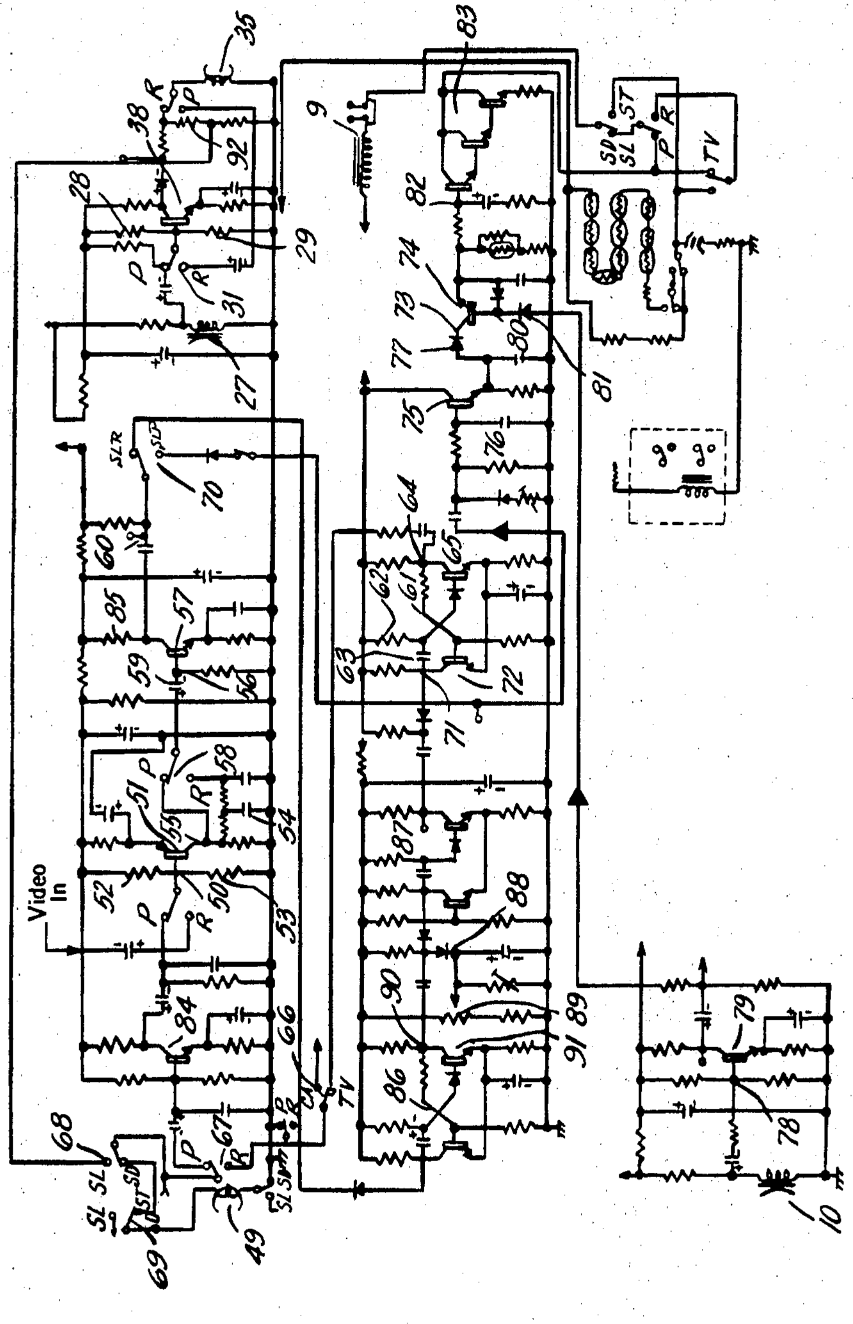
FIG. 3 is a schematic diagram of the basic servo circuits preferably adapted to a part of the servosystem of the video-tape recorder of FIG. 1.

FIG. 3 is a detailed circuit diagram of the electronic components of the system shown in FIG. 1. Where applicable, the corresponding numbers of the blocks of FIG. 1 have been marked.

In recording at normal speed (SDR), composite video signals from a television set or a television camera are applied through a switch **50*a* to the base electrode 50 of a transistor 51 which operates with switch 58 in SDP as a synchronous signal separator and is so biased by resistors 52, 53 that only vertical synchronous pulses are produced at the collector 55. Horizontal sync pulses are eliminated by an RC integrating circuit 54 connected to the collector electrode 55 of transistor 51 and only vertical sync pulses are obtained. The separated vertical sync pulses are applied to the base electrode 56 of a pulse amplifying transistor 57 through switch 58 and a coupling capacitor 59, and are wave-shaped and amplified as well. The output pulses of the pulse amplifying transistor 57 are differentiated by an RC differentiating circuit 60 and trigger a one-shot wave shaping multivibrator 61 via a switch 70 which is in SDR position. The width of the output pulse of the one shot multivibrator 61 is determined by the time constant of a capacitor 62 and a resistor 63**. The pulse width output of multivibrator is selected to be on the order of 20 msec. which is longer than that of the trigger pulse.

The output pulses produced across the collector 64 of the transistor 65 are applied to the control head 49 through switches 66 (always closed) 67 (R), 68 (SD), 69 (SD) and recorded on the control track TC of the tape as the standard control signals.

Output pulses across the collector 71 of the transistor 72 of the one shot multivibrator 61 are applied to the collector 73 of a phase comparing transistor 74 which is caparator 7, via an emitter follower transistor 75 for matching impedance, on RC integrating circuit 76 and a protecting diode 77. Phase detecting pulses induced across the detecting coil 10 that have a pulse interval in proportion to the rotary phase of the rotary member 12 of FIG. 1 are applied to the base electrode 78 of a preamplifying transistor 79 and the amplified pulses are coupled to the base electrode 80 of phase comparing transistor 74 through a protecting diode 81. This is the action, previously described, taking place during normal speed recording. The heads are synchronized in phase to the vertical sync signals, which have been modified by the trigger 61. The sync signals are compared with the detected pulses from pickup coil 10. Error signals from said comparing transistor 74 are coupled to the base electrode 82 of power amplifying transistors 83 in a Darlington configuration and control the brake torque of an eddy current brake 9 to maintain the rotary phase of said rotary member 12 locked to that of the standard. The member 12 is designed to rotate at the speed little faster than that of the standard to which it is to be controlled.

At the same time, the normal speed recording is taking place, the pulse detecting coil 27 facing the *n* magnetic pieces 21—25 on the reverse side of rotary disc 12 produces output pulses. These output pulses from pulse detecting coil 27 are amplified to the recording level by the transistor 38 and are applied to the slow-motion control head 35 to be recorded on the slow-motion control track of the tape as slow-motion control signals which have the frequency of *n* times that of the standard control signals. In FIG. 3, switch 21 is shown in the SLR position.

In normal speed reproduction SDP, the pulses of the standard control signal track TC induced across the control head 49 have a wave shape of differentiated rectangular pulses. They are applied to preamplifier 84 through switches 69[(SD) / 68 (SD)]/ [and 67 (P)] and are amplified to be pulses of one polarity. These pulses are then applied through switch **50*a* to wave shaping circuits 55, 57. Amplified pulses appearing across the load resistor 85 of the wave shaping transistor 57 are differentiated by an RC differentiating circuit 60 and trigger a first delay multivibrator 86 in the wave shape and control circuit 40 to be delayed in about 17 msec. Delayed pulses from the first delay multivibrator 86 trigger a second delay multivibrator 87 through a diode clamp circuit 88 the clamping level of which is adjustable by a variable divider resistor 89. Adjusting the value of the divider resistor 89 shifts the cutoff voltage at the collector 90 of a transistor 91. Since the higher the collector voltage becomes, the greater is the charging potential for the multivibrator. This makes the discharge time longer and the pulse width wider. The variable divider resistor 89 is called the "tracking volume" by which the phase of output pulses from the first delay multivibrator 86 is made to be delayed or advance with respect to the output pulses across the load resistor 85 of the transistor 57. The signals at the output of the second delay multivibrator 87 is applied to the base of transistor 75 and then to the phase detector 74 where they are compared with the detected signals from pickup coil 10. The error signal, if any, operates the brake as previously described. When the signals from pickup head 10 and the standard control signals from head 49 coincide at the phase detector 74**, there is no error output signal and the rotary heads are perfectly controlled to retrace on the recorded track during normal speed reproduction.

In slow-motion reproduction (SLP), the tape is transported around the periphery of the guide cylinder at the speed of $1/n$ that of normal reproduction and a different cross angle between the plane of the recording gap of the guide cylinder and the recorded track is compensated for to cancel the tracking error between the locus of the heads and the track on the tape by a tracking error compensating device. Such a device is disclosed in the two aforesaid copending patent applications. The tape is being conveyed at the speed of $1/n$ that of recording, the slow-motion control signals on the slow-motion control track are reproduced by head 35 into differential wave shape signals with both polarities which are applied through switch 31 to transistor 38. The transistor 38 of the pulse amplifier 19 is biased class C and operates to select and to amplify a series of pulses of one polarity. Output pulses appearing across a load resistor 92 are applied to the base electrode of common emitter transistor 84 through switches 68 (in SL position), 67 (in position P), and then after this the same operation takes place as that of normal speed reproduction concerning the control of the rotary phase of said heads.

Figures 4, 5:
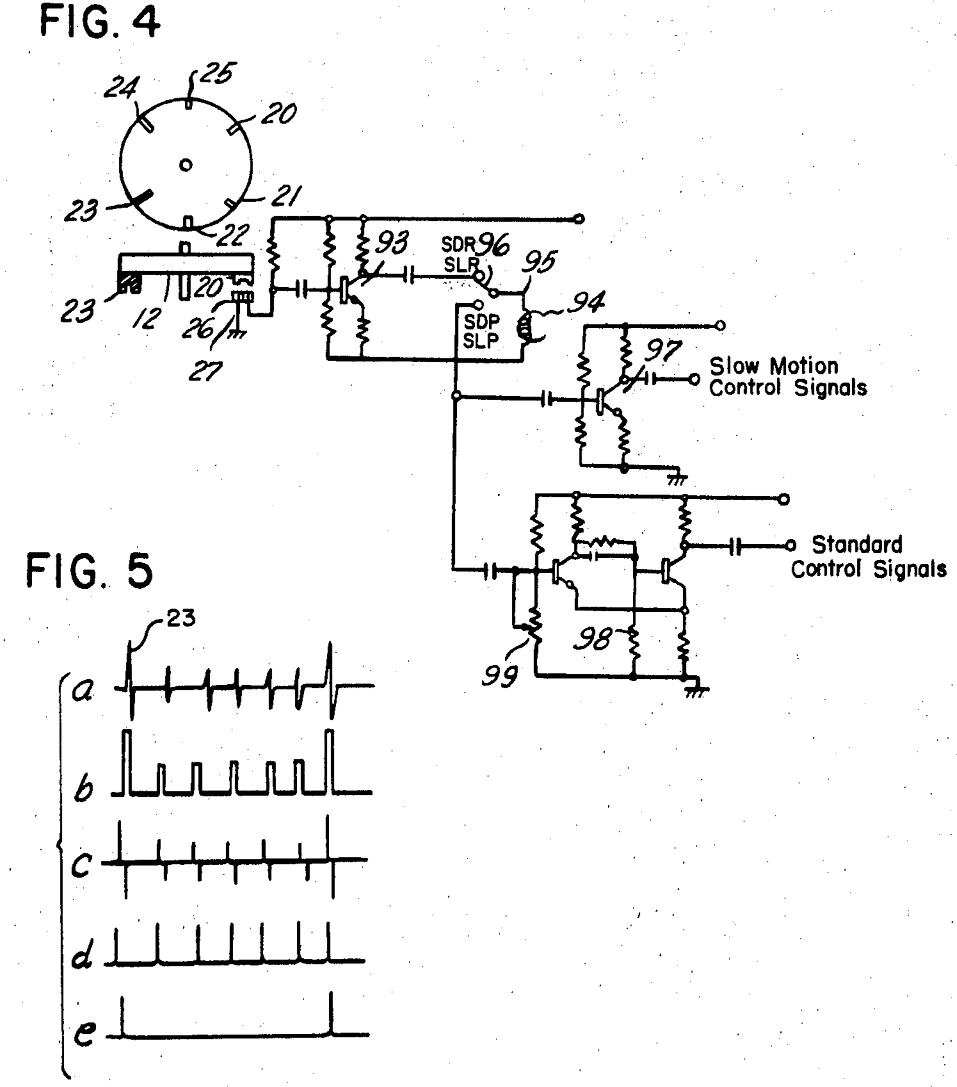
FIG. 4 is a schematic diagram of another portion of the circuit of FIG. 1.
FIG. 5 shows the wave forms, as an explanation of the operation of the circuit of FIG. 4.

Another embodiment of the invention for recording and reproducing control and/or slow-motion control signals is disclosed in FIG. 4 wherein both control signals are mixed in different levels and recorded on the same control track. Mixing control signals is easily accomplished by various methods, one embodiment of which is disclosed in FIG. 4. One of the magnetic pieces 23 mounted on the reverse side of the rotary disc 12 is designed to be different in size to induce a pulse in the detecting coil 27 means of at least twice the level of the pulses induced by other pieces 20, 21, 22, 24 and 25.

FIG. **5-*a* illustrates the periodic pulses induced in the pulse detecting means 27 by magnetic pieces 20—25. The series of said pulses, as shown in FIG. 5-*a* have two different level pulses and are bipolar. The larger amplitude pulse is produced by piece 23. These pulses are applied to an amplifier 93 operating class C which selects a series of pulses of one polarity as shown in FIG. 5-*b* which is amplified for recording by a fixed control head 94**.

The wave shape, as illustrated in FIG. **5-*c* reproduced of the pulses of FIG. 5-*b* by control head 94 is a differentiated form from that of the recorded signals as shown in FIG. 5-*b*. An output lead terminal 95 of the control head is connected by a switch 96 to a pulse amplifying circuit 97 and a Schmitt trigger circuit 98 connected in parallel relation. The reproduced pulses of FIG. 5-*c* are converted into a series of all pulses of one polarity of the same amplitude by the pulse amplifier 97 as shown in FIG. 5-*d*. The signals of FIG. 5-*e* saturate amplifier 97. The output signals of FIG. 5-*b* from the pulse amplifier 97 are used as the slow-motion control signals. The Schmitt trigger circuit 98 is activated only by the larger amplitude pulses of FIG. 5-*c* in accordance with a level selected by a variable divider 99. FIG. 5-*e* shows the output signals of the Schmitt circuit 98** and these signals are available for standard control signals in normal speed reproduction.

I claim:

1. In a video-tape recorder of the type having a rotating head member which records signals on and reproduces signals from a magnetic tape at a first normal speed and reproduces signals from the tape at a slowed-down speed of $1/n$ the normal speed, where $n$ is an integer, the improvement comprising servo means for controlling the rotary phase of said rotating head member, means for producing and recording standard control signals corresponding to the speed of recording and means for producing and recording slow-motion control signals at a rate $n$ times that of the standard control signals, first means responsive to the standard control signals reproduced during normal speed reproduction and second means responsive to the slow-motion control signals reproduced during slow-motion production for producing signals to control the operation of said servocontrol means.

2. Apparatus as in claim 1 wherein said means for producing the slow-motion control signals comprises $n$ separate means rotatable with the rotating head member and pickup means responsive to the positions of said $n$ separate means to produce the control signals.

3. Apparatus as in claim 1 wherein said means for producing the standard control signals comprises standard means rotatable with the rotating head member and pickup means responsive to the standard rotatable means to produce the control signals.

4. Apparatus as in claim 1 wherein said means for producing the standard control signals and the slow-motion control signals comprises $n$ separate means rotatable with the rotating head member and pickup means responsive to the positions of said $n$ separate means to produce the slow-motion control signals, one of said $n$ separate means also producing a signal having a different characteristic than the slow-motion control signal which is the standard control signal.

5. Apparatus as in claim 1 wherein said signal producing and recording means produces separate standard and slow-motion control signals which are recorded on separate tracks of the tape.

6. A video-tape recorder as in claim 1 wherein said first and second means each include a respective means rotatable with the rotary head member for producing first and second detecting signals which have a frequency of the standard control signals.

7. A video-tape recorder as in claim 6 wherein said means rotatable with the head for producing the detecting signals comprises a magnetic piece and a stationary pickup coil.

8. Apparatus as in claim 1 wherein said means for producing the standard control signals is responsive to synchronizing signals on the video signals being recorded.

9. Apparatus as in claim 8 wherein the synchronizing signals are the vertical synchronizing signals.

10. Apparatus as in claim 1 wherein said signal producing and recording means produces mixed standard on slow-motion control signals which are recorded on one track of the tape.

11. Apparatus as in claim 10 wherein said signal producing means comprises $n$ separate magnetic pieces rotatable with the rotating head member, and a pickup coil, one of said $n$ pieces producing a signal of a different amplitude in the pickup coil than the other pieces.

12. Apparatus as in claim 1 wherein said first means comprises means responsive to the rotation of the head member for producing a first detection signal at a rate equal to that of the recorded standard signal during normal speed reproduction and a second detection signal at a rate $1/n$ that of the recorded slow-motion control signals during slow-motion reproduction.

13. Apparatus as in claim 12 further comprising phase comparator means for comparing during standard speed reproduction the first detection signals and the reproduced standard control signals and during slow speed reproduction the second detection signals and the reproduced slow-motion control signals, said comparing means producing an error signal, and means responsive to the error signal for controlling the speed of the rotating head member.